US012657000B2

(12) United States Patent
    Kim et al.

(10) Patent No.:    US 12,657,000 B2
(45) Date of Patent:       Jun. 16, 2026

(54) DISPLAY APPARATUS AND METHOD FOR CONTROLLING THE SAME

(71) Applicant: LG ELECTRONICS INC., Seoul (KR)

(72) Inventors: Yunam Kim, Seoul (KR); Sinan Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/673,944

(22) Filed: May 24, 2024

(65) Prior Publication Data

US 2024/0345800 A1      Oct. 17, 2024

Related U.S. Application Data

(63) Continuation of application No. 18/469,845, filed on Sep. 19, 2023.

(30) Foreign Application Priority Data

Apr. 13, 2023    (KR) ........................ 10-2023-0048626
Jul. 3, 2023    (KR) ........................ 10-2023-0085832

(51) Int. Cl.
    *G06F 3/16*          (2006.01)
    *G06F 3/04847*       (2022.01)
                (Continued)

(52) U.S. Cl.
    CPC .......... *G06F 3/165* (2013.01); *G06F 3/04847* (2013.01); *G06F 3/04886* (2013.01);
                (Continued)

(58) Field of Classification Search
    CPC ....................................................... G06F 3/165
    See application file for complete search history.

(56) References Cited

U.S. PATENT DOCUMENTS 9,208,765 B1    12/2015 Sivertsen
10,141,012 B1*    11/2018 Lavoic ............... G11B 3/08512
                    (Continued)

FOREIGN PATENT DOCUMENTS

CN        102421018        4/2012
CN        113141529        7/2021
                (Continued)

OTHER PUBLICATIONS

Japan Patent Office Application No. 2023-189860, Office Action dated Apr. 9, 2024, 13 pages.
                (Continued)

*Primary Examiner* — James J Debrow
(74) *Attorney, Agent, or Firm* — LEE, HONG, DEGERMAN, KANG & WAIMEY

(57)                ABSTRACT

Disclosed herein is a movable display apparatus configured to display a turntable-themed video. The movable display apparatus includes: a transceiver configured to transmit and receive data to and from a mobile device by wire or wirelessly; a display having a touch screen and configured to display video data and a user interface for receiving control commands for audio data; a speaker configured to output the audio data; and a controller.

24 Claims, 10 Drawing Sheets

(51) Int. Cl.
    *G06F 3/04886*    (2022.01)
    *G09G 3/20*    (2006.01)

(52) U.S. Cl.
    CPC ..... *G09G 3/20* (2013.01); *G06F 2203/04803* (2013.01); *G09G 2340/0464* (2013.01); *G09G 2354/00* (2013.01); *G09G 2370/00* (2013.01)

(56) References Cited

U.S. PATENT DOCUMENTS

| | | | | |
|---|---|---|---|---|
| 10,607,634 | B1 | 3/2020 | Lavoie | |
| 2010/0318204 | A1* | 12/2010 | Daisy | G06F 3/041 |
| 2011/0058056 | A1* | 3/2011 | Lindahl et al. | H04N 5/228 |
| 2013/0132838 | A1 | 5/2013 | Daisy | |
| 2015/0186029 | A1* | 7/2015 | Khani | G06F 3/04883 |
| 2019/0287553 | A1 | 9/2019 | Byerly | |
| 2022/0277041 | A1 | 9/2022 | Paul | |
| 2022/0417660 | A1* | 12/2022 | Wilberding et al. | H04R 3/12 |
| 2024/0223978 | A1* | 7/2024 | Wilberding et al. | H04R 27/00 |
| 2025/0123612 | A1* | 4/2025 | Alfano et al. | G05B 19/31 |

FOREIGN PATENT DOCUMENTS

| | | |
|---|---|---|
| JP | 2004-198759 | 7/2004 |
| JP | 2006-053629 | 2/2006 |
| JP | 2008-242263 | 10/2008 |
| JP | 2022164895 | 10/2022 |
| KR | 1020080064331 | 7/2008 |
| KR | 1020110012125 | 2/2011 |
| KR | 1020110122557 | 11/2011 |
| KR | 10-2015-0059998 | 6/2015 |
| KR | 1020180057473 | 5/2018 |
| KR | 1020210009189 | 1/2021 |
| WO | 2019-176517 | 9/2019 |

OTHER PUBLICATIONS

Korean Intellectual Property Office Application No. 10-2023-0085832, Notice of Allowance dated Jan. 18, 2024, 4 pages.
Korean Intellectual Property Office Application No. 10-2023-0085832, Prior Art Search Report dated Jan. 2, 2024, 11 pages.
Korean Intellectual Property Office Application No. 10-2023-0085831, Prior Art Search Report dated Jan. 2, 2024, 6 pages.
IP Australia Application Serial Number 2024200674, Notice of acceptance for your patent application dated Apr. 2, 2026, 4 pages.

* cited by examiner (a)

(b)

(c)

(d)

(a)

(b)

(c)

(d)

(a)                                    (b)

A                                      B

DISPLAY APPARATUS AND METHOD FOR CONTROLLING THE SAME

CROSS-REFERENCE TO RELATED APPLICATION(S)

This application is a continuation of U.S. patent application Ser. No. 18/469,845, filed on Sep. 19, 2023, which pursuant to 35 U.S.C. § 119, claims the benefit of earlier filing date and right of priority to Korean Application No(s). 10-2023-0048626, filed on Apr. 13, 2023, and 10-2023-0085832, filed on Jul. 3, 3023, the contents of which are all incorporated by reference herein in their entirety.

BACKGROUND

Technical Field

The present disclosure relates to a display apparatus and method for controlling the same.

Discussion of the Related Art

Recently, in multimedia devices such as a mobile phone and a television (TV), a new form factor is being discussed. The form-factor refers to a structured form of a product.

The reason why form-factor innovation is emerging as important in a display industry is because of increasing needs of a user for the form-factor that may be used freely and conveniently regardless of a use situation departing from a typical form-factor customized for a specific use environment in the past, resulted from an increase in consumer mobility, convergence between devices, a rapid progress in smartization, and the like.

For example, vertical TVs are expanding, breaking the stereotype that the TVs are viewed horizontally. The vertical TV is a product that allows the user to change a direction of a screen by reflecting characteristics of the Millennials and Gen Z who are accustomed to enjoying content on mobile. The vertical TVs are convenient because a social media or a shopping site image may be viewed easily and comments may be read while watching videos at the same time. In particular, the advantages of the vertical TV are magnified more when the vertical TV is in association with a smartphone via a near-field communication (NFC)-based mirroring function. When watching regular TV programs or movies, the TV may be switched horizontally.

As another example, a rollable TV and a foldable smartphone are similar to each other in that they both use 'flexible displays'. The flexible display literally means a flexible electronic device. To be flexible, the flexible display must first be thin. A substrate that receives information and converts the same into light must be thin and flexible so that a performance lasts for a long time without damage.

Being flexible means that the flexible display should not be greatly affected even when an impact is applied thereto. While the flexible display is bent or folded, a pressure is continuously applied to a junction. It is necessary to have excellent durability such that the inside is not damaged by such pressure, but also have a property of being easily deformed when the pressure is applied.

The flexible display is implemented based on an organic light-emitting diode (OLED), for example. The OLED is a display using an organic light emitting material. The organic material is relatively more flexible than an inorganic material such as a metal. Furthermore, the OLED has a thin substrate and thus is more competitive than other displays.

In a case of an LCD substrate used in the past, there is a limit to reducing a thickness because liquid crystal and glass are required separately.

There is an increasing demand for TVs capable of being easily moved indoors and outdoors as a new form factor for TVs. Especially, due to the recent COVID-19 pandemic, users are spending more time at home, and there is an increasing demand for second TVs. Furthermore, due to an increase in population engaging in outdoor activities such as camping, there is a demand for TVs with new form factors that are easy to carry and transport.

Such TVs with new form factors may allow display rotation as shown in FIG. 4 and may be used for various purposes such as listening to music. Thus, there is a need for control methods capable of better satisfying user experience.

The above issues or backgrounds are not limited to TVs only, but the issues or backgrounds may be applied to most devices that are designed to output video or audio.

Accordingly, the following descriptions are applied not only to TVs but also to all devices that output video or audio, and the term "display device" is used instead of the term "TV".

SUMMARY

Accordingly, the present disclosure is directed to a display apparatus and method for controlling the same that substantially obviates one or more problems due to limitations and disadvantages of the related art.

To provide a solution to the aforementioned issues, the present disclosure proposes a method of displaying a theme screen for listening to music and controlling a sound source on the theme screen.

In addition, the present disclosure proposes a method of controlling an image displayed on a display based on a rotation state of the display.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, there is provided a display apparatus configured to display a turntable-themed video. The display apparatus includes: a transceiver configured to transmit and receive data to and from a mobile device by wire or wirelessly; a display having a touch screen and configured to display video data and a user interface for receiving control commands for audio data; a speaker configured to output the audio data; and a controller. The controller may be configured to: detect the control commands for the audio data received from the mobile device or input through the user interface; and control the display to display a first video in which an image corresponding to a tonearm of a turntable moves from a first position to a second position, based on a first type of control command for the audio data or display a second video in which the image corresponding to the tonearm of the turntable moves from the second position to the first position, based on a second type of control command for the audio data.

In another aspect of the present disclosure, there is provided a method of displaying a turntable-themed video. The method is performed by a movable display apparatus including: a transceiver configured to transmit and receive data to and from a mobile device by wire or wirelessly; a display having a touch screen and configured to display video data and a user interface for receiving control commands for audio data; a speaker configured to output the audio data received from the mobile device; and a controller. The method may include: detecting the control commands for the audio data received from the mobile device or input through the user interface; and displaying, on the display, a first video in which an image corresponding to a tonearm of a turntable moves from a first position to a second position, based on a first type of control command for the audio data or displaying, on the display, a second video in which the image corresponding to the tonearm of the turntable moves from the second position to the first position, based on a second type of control command for the audio data.

It will be understood by those skilled in the art that the above-described aspects of the present disclosure are merely part of various embodiments of the present disclosure, and various modifications and alternatives could be developed from the following technical features of the present disclosure.

The present disclosure has the following effects.

According to the present disclosure, various theme screens or videos may be displayed when an application or program for listening to music is executed, thereby providing users not only with auditory satisfaction but also with visual gratification.

In addition, a suitable theme screen may be displayed when a display rotates, thereby providing users with images without resolution degradation.

The effects that are achievable by the present disclosure are not limited to what has been particularly described hereinabove and other advantages not described herein will be more clearly understood by persons skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
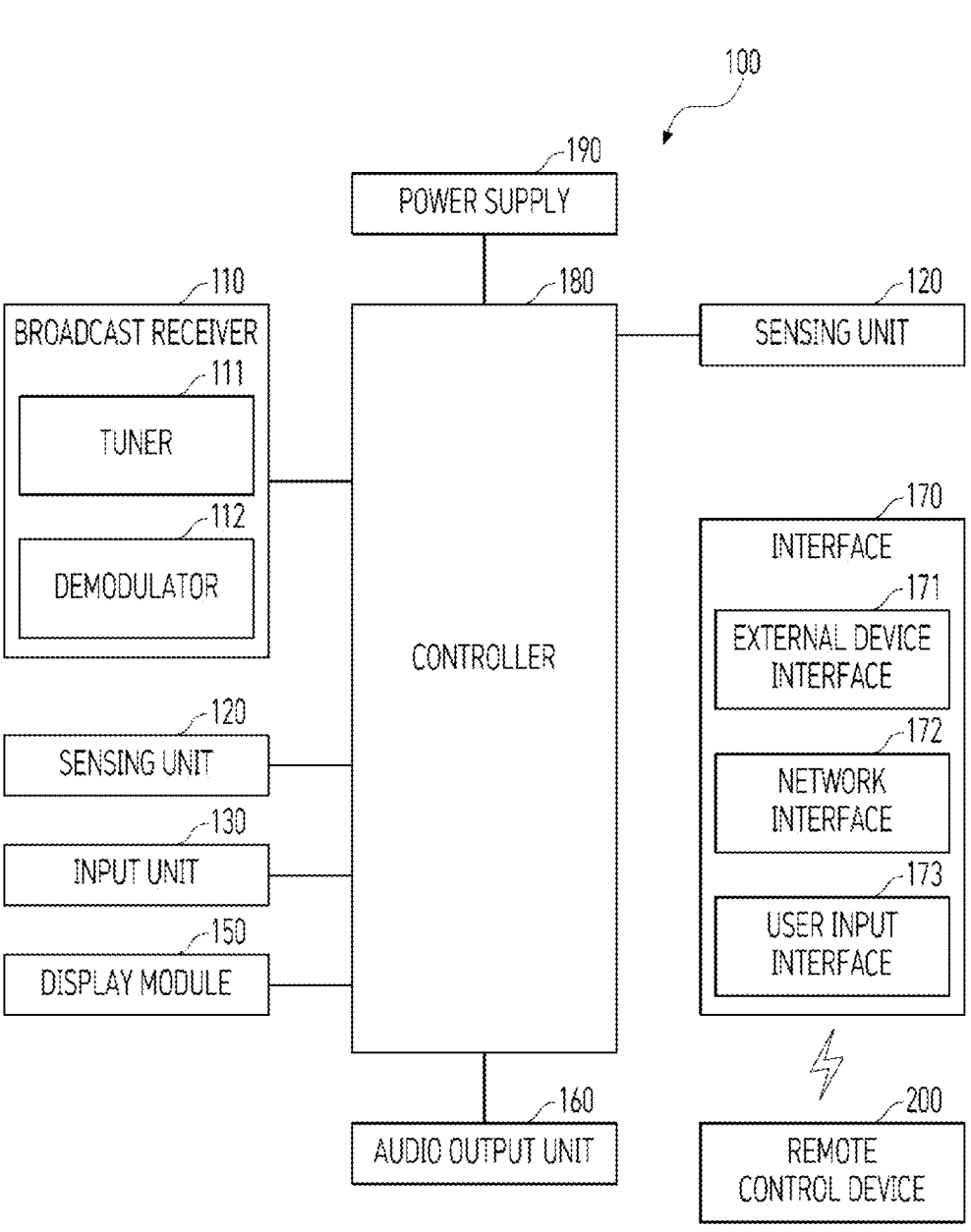
FIG. 1 is a block diagram for explaining each component of a display device according to an embodiment of the present disclosure.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not limited by the terms. The terms are only used to distinguish one component from another.

It should be understood that when a component is referred to as being "connected with" another component, the component may be directly connected with another component, or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

In the following descriptions, the term "display device" will be used. However, the term "display device" may refer to various devices such as TVs, multimedia devices, and so on, and thus, the scope of the present disclosure is not limited to specific terminology.

FIG. 1 is a block diagram for illustrating each component of a display device 100 according to an embodiment of the present disclosure.

The display device 100 may include a broadcast receiver 1210, an external device interface 171, a network interface 172, storage 140, a user input interface 173, an input unit 130, and a controller 180, a display module 150, an audio output unit 160, and/or a power supply 190.

The broadcast receiver 1210 may include a tuner 1211 and a demodulator 1212.

Unlike the drawing, the display device 100 may include only the external device interface 171 and the network interface 172 among the broadcast receiver 1210, the external device interface 171, and the network interface 172. That is, the display device 100 may not include the broadcast receiver 1210.

The tuner 1211 may select a broadcast signal corresponding to a channel selected by the user or all pre-stored channels among broadcast signals received via an antenna (not shown) or a cable (not shown). The tuner 1211 may convert the selected broadcast signal into an intermediate-frequency signal or a base band image or audio signal.

For example, when the selected broadcast signal is a digital broadcast signal, the tuner 1211 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 1211 may process the digital broadcast signal or the analog broadcast signal. The analog base band image or audio signal (CVBS/SIF) output from the tuner 1211 may be directly input to the controller 180.

In one example, the tuner 1211 may sequentially select broadcast signals of all stored broadcast channels via a channel memory function among the received broadcast signals, and convert the selected signals into the intermediate-frequency signal or the base band image or audio signal.

In one example, the tuner 1211 may include a plurality of tuners to receive broadcast signals of a plurality of channels. Alternatively, the tuner 1211 may be a single tuner that simultaneously receives the broadcast signals of the plurality of channels.

The demodulator 1212 may receive the digital IF signal (DIF) converted by the tuner 1211 and perform a demodulation operation. The demodulator 1212 may output a stream signal (TS) after performing demodulation and channel decoding. In this regard, the stream signal may be a signal in which an image signal, an audio signal, or a data signal is multiplexed.

The stream signal output from the demodulator 1212 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180.

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180, and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 1 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module. The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R, G, and B. The plurality of pixels R, G, and B may be formed in respective areas where multiple data lines and multiple gate lines intersect each other. The plurality of pixels R, G, and B may be disposed or arranged in a matrix form.

For example, the plurality of pixels R, G, and B may include a red (hereinafter, 'R') sub-pixel, a green ('G') sub-pixel, and a blue ('B') sub-pixel. The plurality of pixels R, G, and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor, and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image, and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source, and may include a power supply 190 that may be charged and used by including a battery.

In a case of the former, the power supply is used in connection with the cable, and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 1 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

FIGS. 2 to 6 illustrate a display device according to an embodiment of the present disclosure. The display device relates to a display device with a portable form factor.

Figure 2:
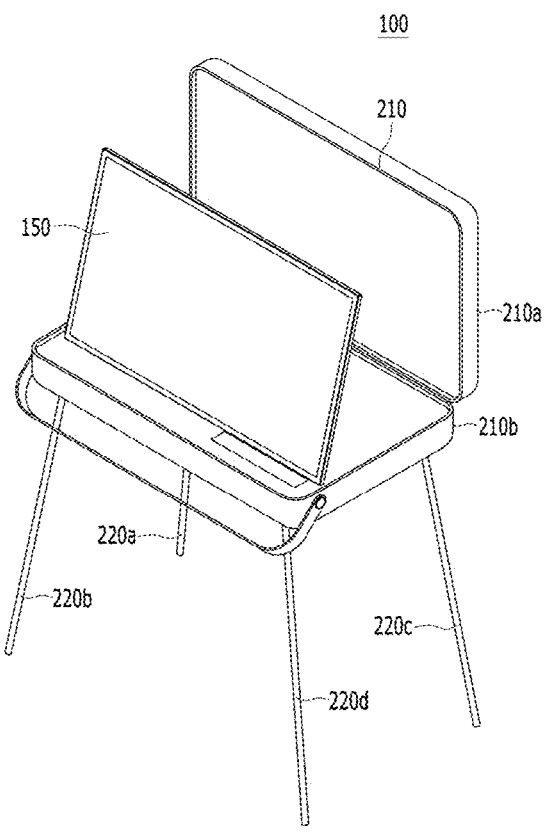
FIG. 2 is a view showing a display device according to an embodiment of the present disclosure.

FIG. 2 is a diagram showing a display device according to an embodiment of the present disclosure. Hereinafter, redundant descriptions duplicate with the above descriptions will be omitted.

Referring to FIG. 2, the display device 100 has the display module 150 accommodated inside a housing 210. In this regard, the housing 210 may include an upper casing 210a and a lower casing 210b, and the upper casing 210a and the lower casing 210b may have a structure of being opened and closed.

In one embodiment, the audio output unit 160 may be included in the upper casing 210a of the display device 100, and the main board that is the controller 180, a power board, the power supply 190, the battery, the interface 170, the sensing unit 120, and the input unit (including the local key) 130 may be accommodated in the lower casing 210b. In this regard, the interface 170 may include a Wi-Fi module, a Bluetooth module, an NFC module, and the like for the communication with the external device, and the sensing unit 120 may include an illuminance sensor and an IR sensor.

In one embodiment, the display module 150 may include a DC-DC board, a sensor, and a low voltage differential signaling (LVDS) conversion board.

In addition, in one embodiment, the display device 100 may further include four detachable legs 220a, 220b, 220c, and 220d. In this regard, the four legs 220a, 220b, 220c, and 220d may be attached to the lower casing 210b to space the display device 100 from the floor.

Figure 3:
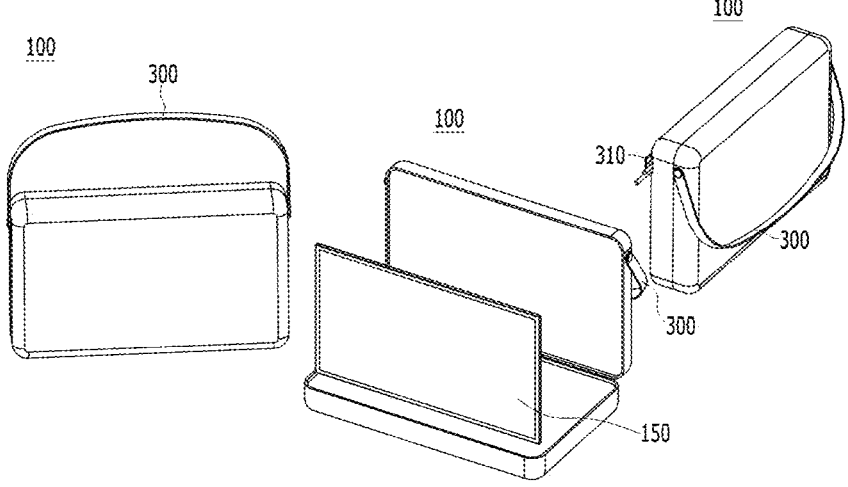
FIG. 3 is a view showing an example of using a display device according to an embodiment of the present disclosure.

FIG. 3 is a diagram showing an example of utilization of a display device according to an embodiment of the present disclosure. Hereinafter, redundant descriptions duplicate with the above descriptions will be omitted.

In the embodiment of FIG. 3, the display device 100 represents an example of utilization that does not include the legs. Referring to FIG. 3, the display device 100 has the structure in which the display module is mounted in the upper casing and the lower casing as described above, and is able to be changed into a structure that may be carried like a bag when the upper casing and the lower casing are closed.

In one embodiment, the display device 100 may include a handle 300 on the upper casing or the lower casing. In this regard, the handle 300 may have a structure attached to left and right side surfaces of the upper casing or the lower casing such that the user may lift the housing with the closed upper casing and lower casing. In this regard, the handle 300 may be made of a material that is easy for the user to hold in the hand, such as leather or plastic.

That is, the display device 100 includes the handle 300 with the upper casing or the lower casing closed, so that the user may easily carry and move the display device 100.

In addition, when necessary, the user may use the mounted display module 150 by placing the lower casing on the floor and opening the upper casing. This will be described in detail with reference to FIGS. 4 and 5.

In addition, in one embodiment, the display device 100 may further include an accommodating space 310 at the side surface of the lower casing. In this regard, the accommodating space 310 may include the various modules described above in FIG. 1. In addition, the accommodating space 310 may include a space for accommodating a touch-pen, a wireless earphone, or the like.

Figure 4:
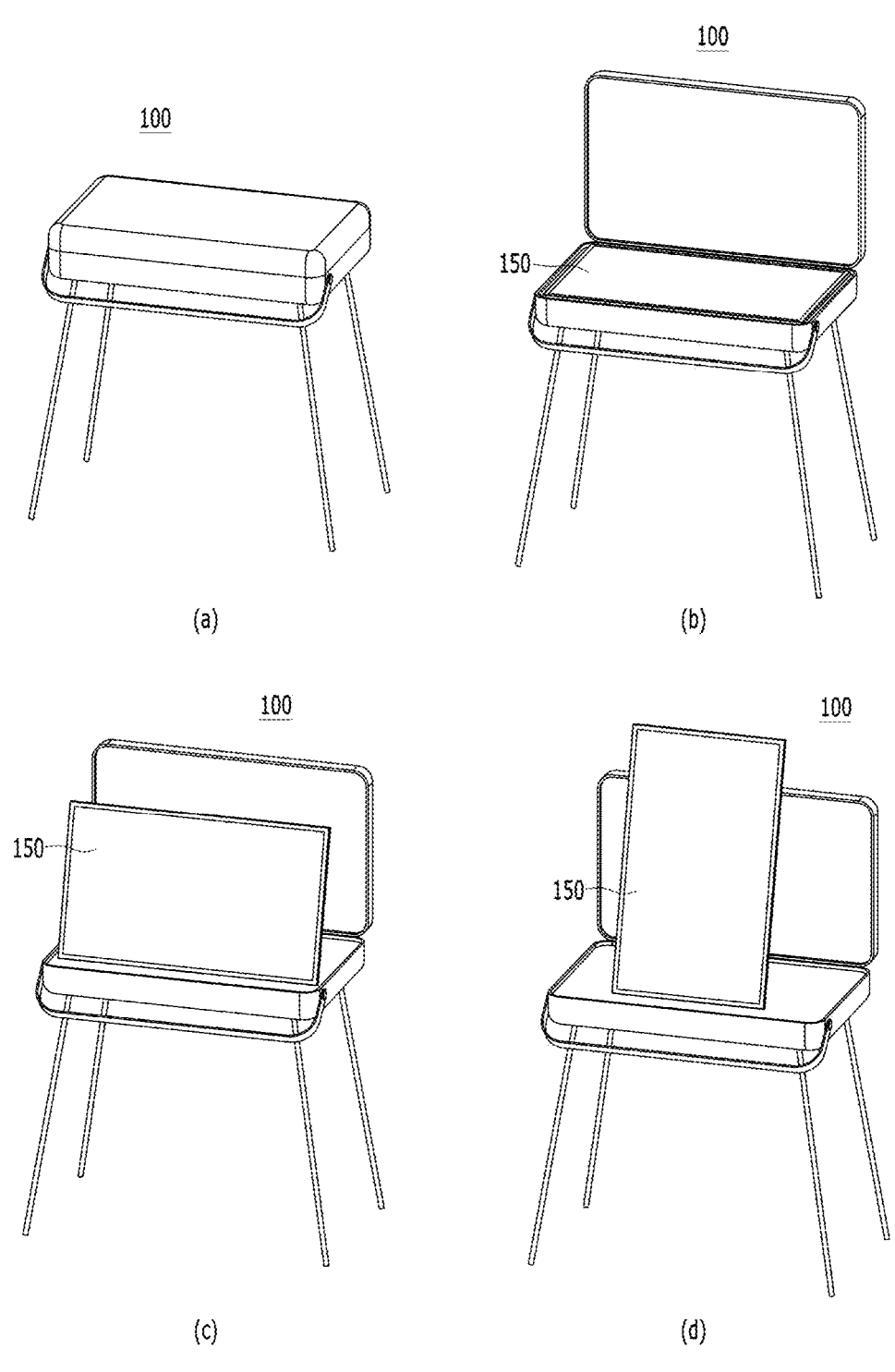
FIG. 4 is another view showing an example of using a display device according to an embodiment of the present disclosure.

FIG. 4 is another diagram showing an example of utilization of a display device according to an embodiment of the present disclosure. Hereinafter, redundant descriptions duplicate with the above descriptions will be omitted.

In one embodiment of the present disclosure, the display device 100 may include four legs. In this regard, the four legs are attached to the lower casing to space the display device 100 from the floor.

Accordingly, the user may not only use the display device 100 while moving the same, but also use the same at a fixed location away from the floor.

In FIG. 4, (a) to (d) show an example of utilization in which the legs of the display device 100 are attached and the display device 100 is used at the fixed location. In this regard, (a) in FIG. 4 shows a state in which the upper casing of the display device 100 is closed, and (b) to (d) in FIG. 4 show a state in which the upper casing is opened.

Specifically, (b) in FIG. 4 shows a state in which the display module 150 is accommodated in the lower casing with the upper casing open. In other words, (b) in FIG. 4 shows a state in which the display module 150 lies inside the lower casing with the upper casing open. Even in the state in which the display module 150 is accommodated in the lower casing, the display module 150 may be activated.

In one embodiment, the display device 100 may provide an edit mode while the display module 150 is accommodated in the lower casing. In this regard, the edit mode may include a function of adding at least one of a memo function, a drawing function, and a voice recording function to a content.

That is, when the display module 150 is mounted on the lower casing, the display device 100 may determine that the user intends to appreciate/watch the content via the display module 150.

On the other hand, when the display module 150 is accommodated in the lower casing, the display device 100 may determine that the user intends to edit the content output on the display module 150. Accordingly, the display device 100 may provide a function of editing the content when the display module 150 is accommodated in the lower casing.

In FIG. 4, (c) shows a state in which the display module 150 is horizontally mounted on the lower casing with the upper casing open, and (d) in FIG. 4 shows a state in which the display module 150 is vertically mounted on the lower casing with the upper casing open. In this regard, (c) and (d) in FIG. 4 show a state in which the display module 150 is erected using the lower casing as a foothold.

In addition, in one embodiment, the display device 100 may automatically accommodate or mount the display module 150 in or on the lower casing using a motor (not shown).

More specifically, when the upper casing of the display device 100 is opened, the display module 150 may be automatically mounted horizontally or vertically on the lower casing.

In addition, in another embodiment, when the upper casing of the display device 100 is opened, the display module 150 may be primarily accommodated on the lower casing. Thereafter, the display device 100 may mount the display module 150 on the lower casing in response to a signal of touching the display module 150 and a signal input from the sensing unit or the input unit. For example, the user may mount the display module 150 on the lower casing by pressing the display module 150 accommodated inside the lower casing downwardly. This will be described in detail with reference to FIG. 5.

Figure 5:
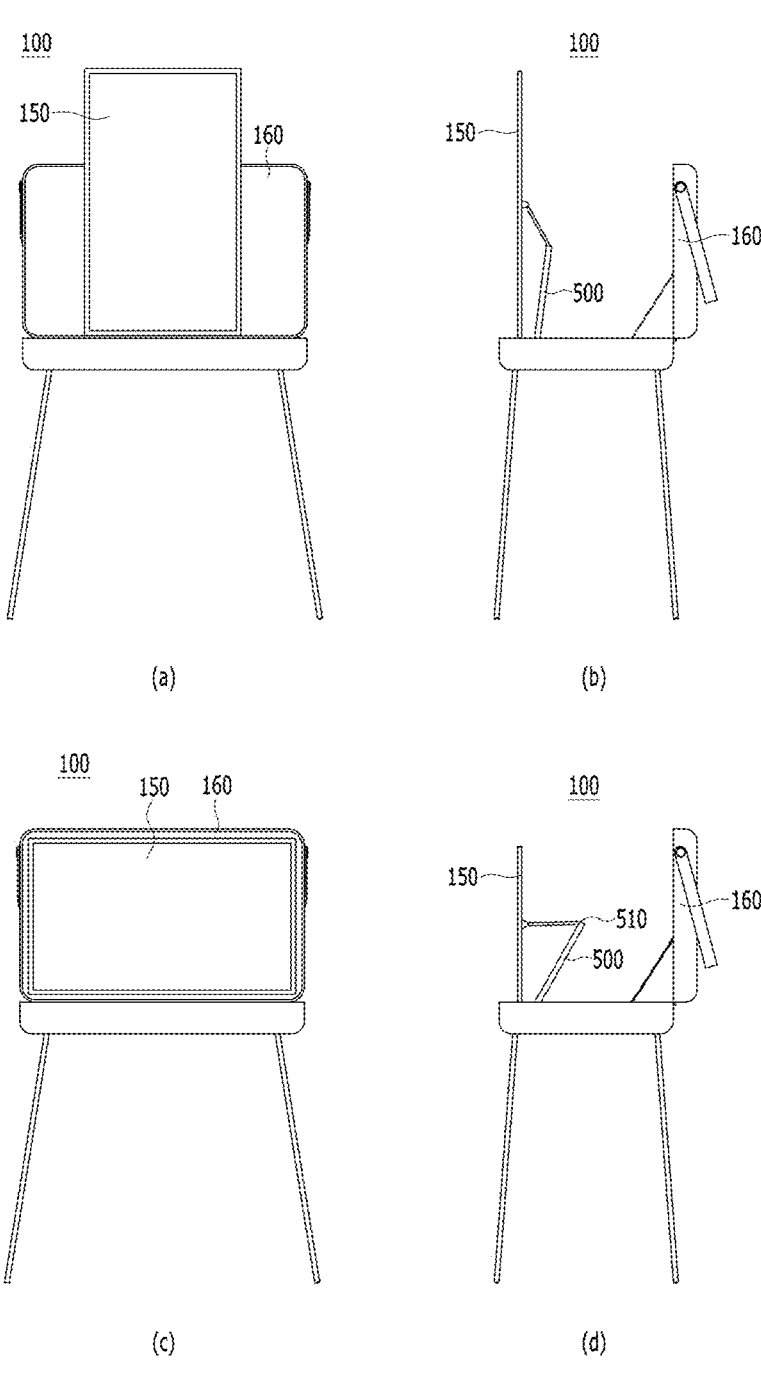
FIG. 5 is a view showing front and side surfaces of a display device according to an embodiment of the present disclosure.

FIG. 5 is a diagram showing front and side surfaces of a display device according to an embodiment of the present disclosure. Hereinafter, redundant descriptions duplicate with the above descriptions will be omitted.

In FIG. 5, (a) and (b) show a state in which the display module 150 is mounted vertically, and (c) and (d) show a state in which the display module 150 is mounted horizontally.

In FIG. 5, (a) and (c) are views showing the display device 100 from the front, and (b) and (d) are views showing the display device 100 from the side.

In one embodiment, because the upper casing may include the audio output unit 160, in (a) in FIG. 5, the display module 150 may be mounted vertically and there may be the upper casing including the audio output unit 160 at the rear of the display module 150.

Referring to (b) in FIG. 5, the display device 100 may further include a support member 500 to vertically mount the display module 150 on the lower casing. That is, when the display device 100 is viewed from the side as shown in (b) in FIG. 5, the support member 500 may be included in the lower casing and may be designed in a foldable structure to vertically mount the display module 150. In this regard, the support member 500 may be controlled by the motor of the display device 100 and may be operated manually by the user's hand.

Referring to (c) in FIG. 5, the display device 100 may have the display module 150 mounted thereon horizontally and the audio output unit 160 at the rear of the display module 150.

Referring to (d) in FIG. 5, the display device 100 may include the support member 500 to horizontally mount the display module 150 on the lower casing. In this regard, the support member 500 may be the same as the support member 500 in (b) in FIG. 5, but may be in a state in which a hinge 510 included in the support member 500 is folded more to horizontally mount the display module 150.

In addition, in one embodiment, the display module 150 may be manually mounted horizontally or vertically by the user's hand. In another embodiment, the display module 150 may be mounted horizontally or vertically on the lower casing in response to the control of the display device 100. In this regard, the display device 100 may mount the display module 150 horizontally or vertically based on the control signal of the user (sensed via the sensing unit or the input unit).

Figure 6:
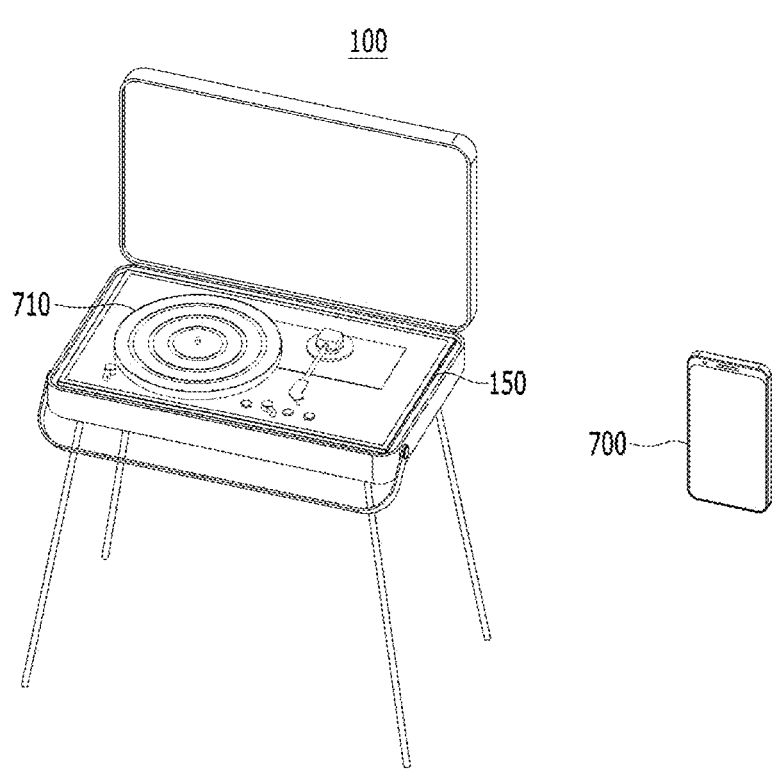
FIG. 6 is a view showing an example of connecting a display device according to an embodiment of the present disclosure with an external device.

FIG. 6 is a view showing an example of connecting a display device according to an embodiment of the present disclosure with an external device. Repetitive description of like elements employed in other embodiments described herein is omitted for sake of brevity.

FIG. 6 illustrates a mode for connecting with an external device 700 to play or output audio data (i.e., sound source data) (hereinafter referred to as "sound source" for simplicity). FIG. 6 shows a state in which the display module 150 is coupled to the housing of the display device 100 while the upper casing of the housing of the display device 100 is open. However, the display module 150 may also operate in a state where the display module 150 is horizontally or vertically supported by the lower casing as shown in (c) and (d) of FIG. 4.

According to an embodiment, in the audio playback mode, the display device 100 may output a sound source received from the external device 700 as audio signals through the audio output unit 160 attached to the upper casing of the housing. The sound source received from the external device 700 includes a sound source stored in the external device 700 or a sound source streamed by the external device 700 through a network. In this case, the display device 100 may output the sound source received from the external device 700 while displaying audio-themed screens 710 such as a turntable on the display module 150.

Hereinafter, a method of displaying the audio-themed screens 710 on the display module 150 and control method therefor will be described. The audio-themed screens 710 may be executed when a program or application for audio playback installed on the external device 700 is launched and when a sound source is streamed wirelessly to the display device 100, where the external device 700 is wirelessly connected to the display device 100. Alternatively, the audio-themed screens 710 may be executed when a sound source stored on the display device 100 or a sound source stored on a storage medium (e.g., universal serial bus (USB)) connected to the display device 100 is played by a program or application for audio playback installed on the display device 100. The present disclosure proposes the method of displaying the audio-themed screens 710 on the display module 150 and control method therefor without being limited to either of the two cases.

Figure 7:
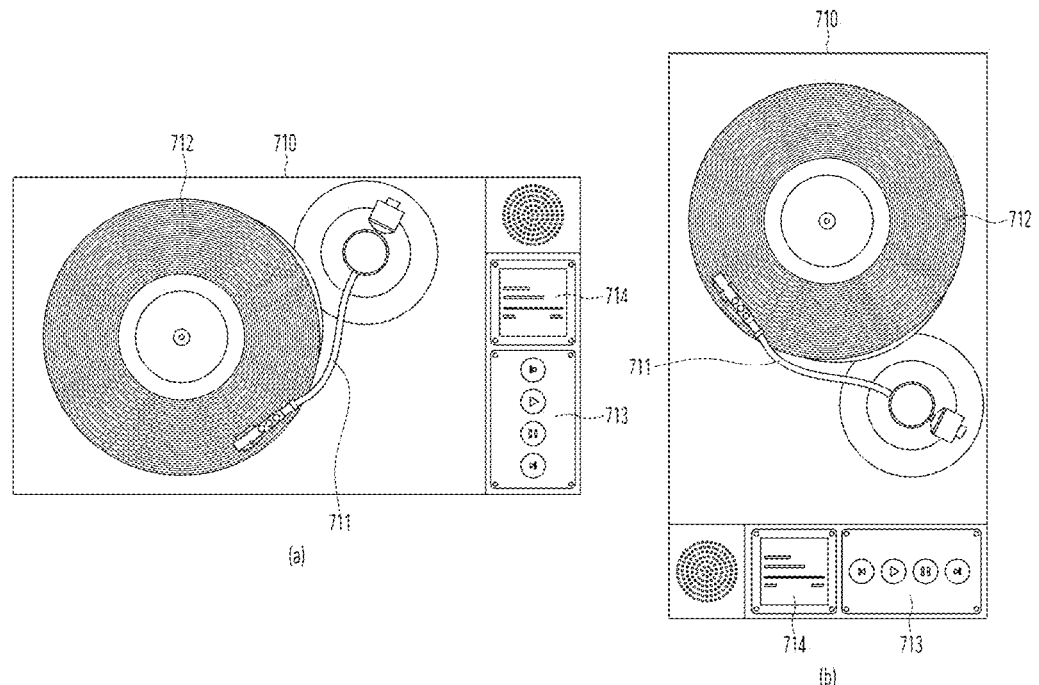
FIGS. 7 and 8 illustrate theme screens for playing a sound source according to an embodiment of the present disclosure.

FIG. 7 illustrates an image displayed on the display module 150 (hereinafter referred to as "display") according to the proposed technology. The image shown in FIG. 7 may be displayed on the display when the audio playback mode or a program or application (i.e., service) therefor is executed by the display device 100.

FIG. 7 shows a turntable theme, which is one of the audio-themed screens 710. The turntable-themed screen 710 includes a tonearm 711, a long-playing (LP) record 712, a user interface 713 for audio playback control, and a sound source information display window 714. The turntable-themed screen 710 is designed to represent a scene of playing an LP record on a turntable.

In FIG. 7, (a) represents the landscape mode of the display, and (b) represents the portrait mode of the display. The landscape mode refers to a state in which the display is placed horizontally on a stand or case, and the portrait mode refers to a state in which the display is placed vertically on a stand or case.

The turntable theme of FIG. 7 may be applied not only when the display device 100 receives and outputs a sound source from the external device 700 as shown in FIG. 6 but also when the display device 100 receives and outputs a sound source independently.

When an audio playback command is entered through the user interface 713, the display device 100 may display an image that depicts the movement of the tonearm 711 and the rotation of the LP record 712 by simulating the operation of a real turntable.

On the other hand, when an audio pause command is entered through the user interface 713, the display device 100 may display an image that depicts the movement of the tonearm 711 and the rotation of the LP record 712 by simulating the operation of the real turntable.

Displaying an image that depicts the operation of the real turntable as described above may serve as an element that promotes emotions in the user and thus give the user a feeling of using the real turntable.

The user interface 713 for audio playback control may display a controller for controlling the following functions: play, pause, next (playing the next track, fast-forwarding, etc.), and previous (playing the previous track, rewinding, etc.). Additionally, the user interface 713 for audio playback control is configured along with a touch input interface. Accordingly, when a user's touch input is detected in an area corresponding to a graphic user interface (UI) for audio playback control, an audio control command related thereto is delivered to the controller 180 of the display device 100.

The sound source information display window 714 may display information on the title, artist, play/pause state, playback time, or remaining playback time of a sound source.

Figure 8:
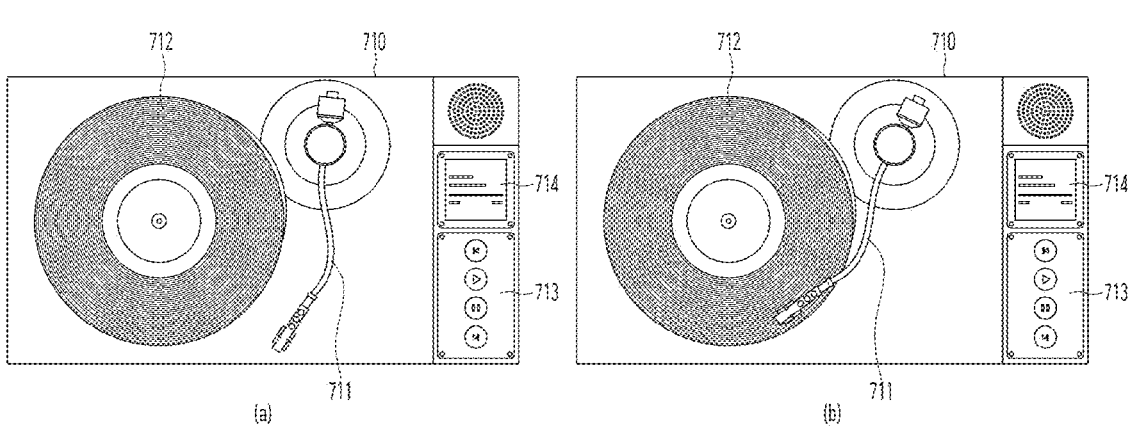

FIG. 8 illustrates an image displayed on a display according to the proposed technology.

In FIG. 8, (a) represents an image when the playback of a sound source is paused and (b) represents an image when the sound source is playing. In (a) of FIG. 8, since the playback of the sound source is paused, the tonearm 711 is positioned at an initial position. In (b) of FIG. 8, since the sound source is playing, the tonearm 711 is positioned on top of the LP record 712.

Accordingly, when the playback of the sound source is paused, if the audio playback command is entered through the user interface 713, the display is configured to switch from displaying the scene of (a) in FIG. 8 to displaying the scene of (b) in FIG. 8. Additionally, the audio output unit 160 is configured to output the sound source in response to the audio playback command. Furthermore, when outputting the sound source, the audio output unit 160 may output sound such as noise, and more particularly, sound obtained by simulating the surface noise of a real LP record.

When the sound source is playing, if the audio pause command is entered through the user interface 713, the display is configured to switch from displaying the scene of (b) in FIG. 8 to displaying the scene of (a) in FIG. 8. Additionally, the audio output unit 160 is configured to pause outputting the sound source in response to the audio pause command.

Additionally, the image 710 displayed on the display depending on the audio playback/pause command may be provided in the form of a video. In other words, a video depicting the transition from when the playback of a sound source is paused to when the sound source is playing (or vice versa) is displayed on the display, based on the input of the audio playback command (or audio pause command). This video may include the movement of the tonearm 711 from the scene of (a) in FIG. 8 to the scene of (b) in FIG. 8 or the movement of the tonearm 711 from the scene of FIG. 8(*b*) to the scene of (a) in FIG. 8. Furthermore, instead of simply showing the transition from the scene of (a) in FIG. 8 to the scene of FIG. 8(*b*), the video may depict the following movement of the tonearm 711 based on the operation of the real turntable. That is, the tonearm 711 lifts from the initial position, swings along a swing path with respect to a swing axis, moves upwards towards the LP record 712, and then moves down to play the LP record 712. This configuration may be applied similarly to the transition from the scene of (b) in FIG. 8 to the scene of (a) in FIG. 8.

Additionally, the image 710 displayed on the display during the playback of the sound source may also be provided in the form of a video. This video may depict the movement of the tonearm 711 and the LP record 712 when the sound source is playing. Specifically, the video may show that the tonearm 711 swings along the swing path with respect to the swing axis towards the center of the LP record 712 as the sound source plays over time. In addition, the video may also show the rotation of the LP record 712.

Figure 9:
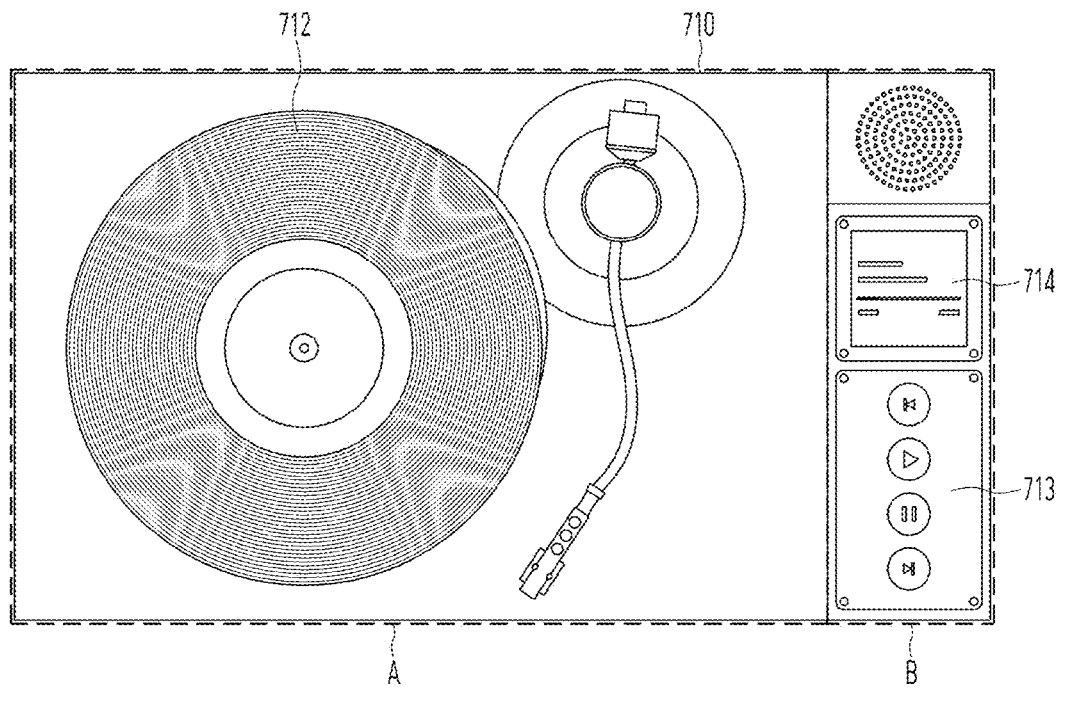
FIG. 9 illustrates a partial area of a theme screen for playing a sound source according to an embodiment of the present disclosure.

In FIG. 9, an area A of the turntable-themed screen 710 corresponds to a portion for displaying an image (or video) that depicts the operation of a turntable, and an area B of the turntable-themed screen 710 corresponds to a portion for displaying the user interface 713 for audio playback control and the sound source information display window 714. The area A may be referred to as "image part", and the area B may be referred to as "information and control part".

While the turntable-themed screen 710 is displayed on the display, another user interface for audio playback control may be configured in addition to the user interface 713 for audio playback control.

Figure 10:
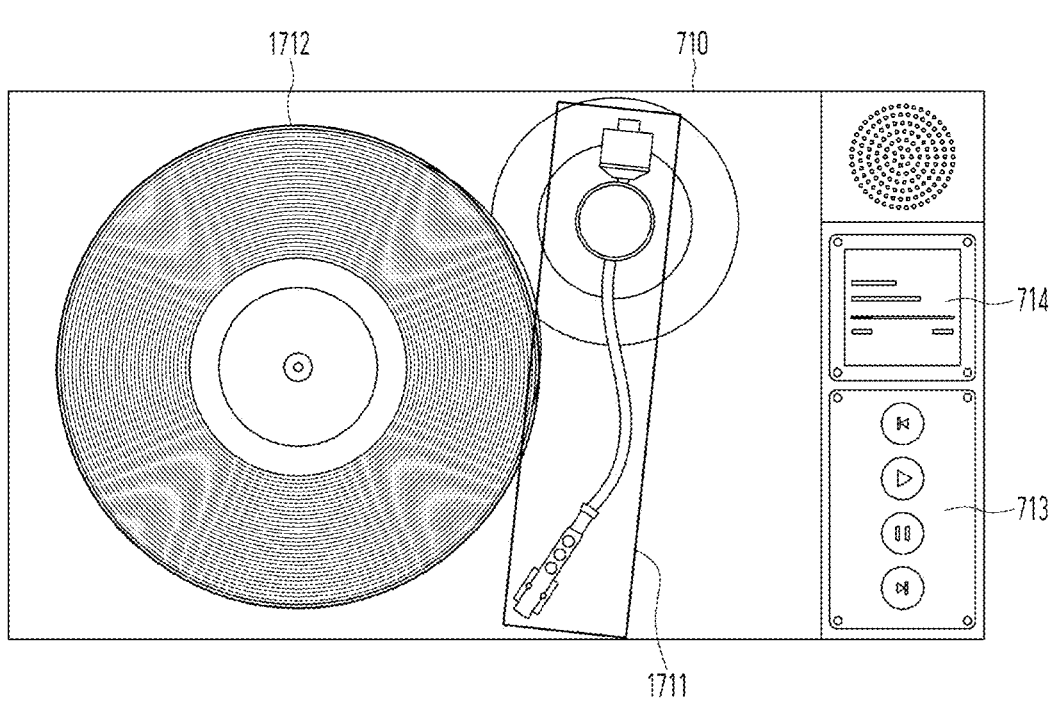
FIG. 10 illustrates touch user interfaces configured on a theme screen for playing a sound source according to an embodiment of the present disclosure.

Referring to FIG. 10, a touch user interface is configured in each of a first partial area 1711 and a second partial area 1712 of the turntable-themed screen 710. The first partial area 1711 may be configured at a position corresponding to the tonearm 711 of the turntable-themed screen 710, and the second partial area 1712 may be configured at a position corresponding to the LP record 712.

When a touch input is detected on the touch user interface configured in the first partial area 1711 and second partial area 1712, predetermined audio playback control may be executed. In addition, when a touch input is detected on the touch user interface configured in the first partial area 1711 and second partial area 1712, a video related thereto may be displayed on the display.

Figure 11:
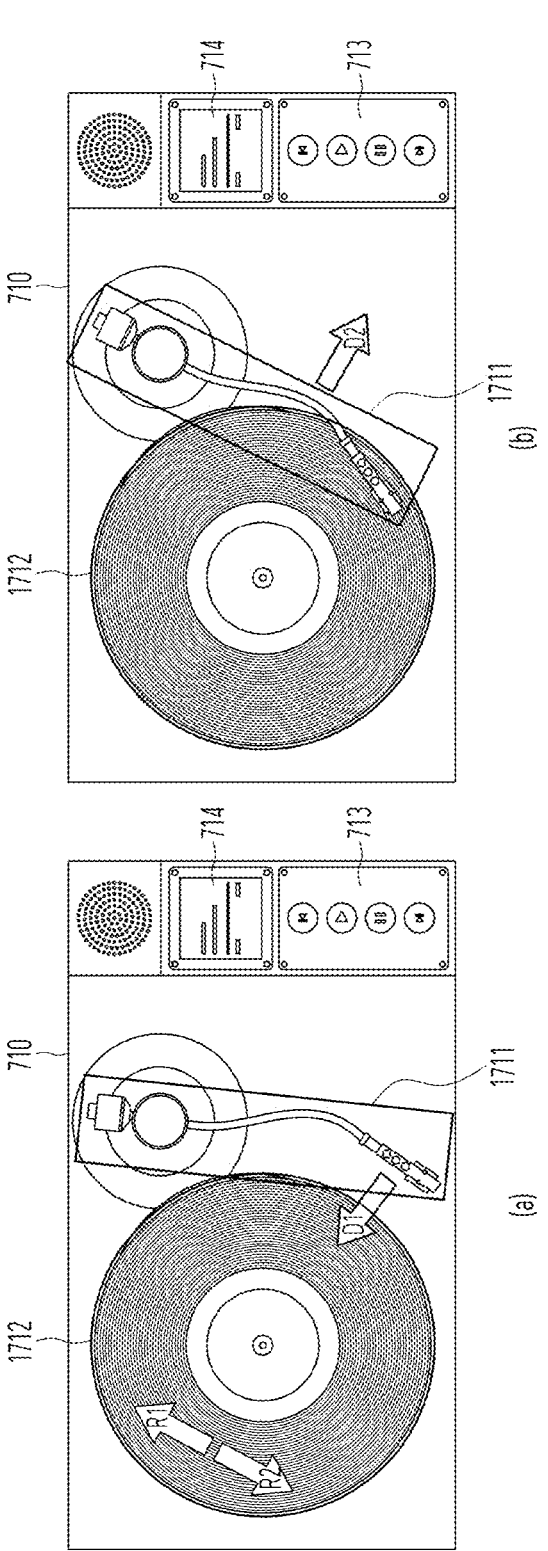
FIG. 11 illustrates a scenario of a touch input to a touch user interface configured on a theme screen for playing a sound source according to an embodiment of the present disclosure.

FIG. 11 illustrates exemplary inputs to a touch user interface (hereinafter such an input is referred to as "touch input") depending on audio playback states. In FIG. 11, (a) shows a touch input when the playback of a sound source is paused, and (b) shows a touch input when the sound source is playing.

When the playback of the sound source is paused, if a touch input (e.g., drag) in a direction D1 is detected in the first partial area 1711 of the touch user interface, the playback of the sound source may be initiated. In addition, an image in which the tonearm 711 is positioned on top of the LP record 712 may be displayed on the display as shown in (b) of FIG. 8. This image may be provided as a video. In this case, the start frame of the video may be (a) in FIG. 8, and the last frame thereof may be (b) in FIG. 8.

When the sound source is playing, if a touch input (e.g., drag) in a direction D2 is detected in the first partial area 1711 of the touch user interface, the playback of the sound source may be paused. As shown in (a) of FIG. 8, an image in which the tonearm 711 is positioned at the initial position may be displayed on the display. This image may be provided as a video. In this case, the start frame of the video may be (b) in FIG. 8, and the last frame thereof may be (a) in FIG. 8.

Touch inputs to the first partial area 1711 may have no directionality. In this case, regarding the operations depending on the touch inputs, audio playback control may be determined based on the audio playback state (or image displayed on the display, which correspond to the audio playback state). In other words, if a touch input is detected in the first partial area 1711 while the sound source is playing, the touch input may be interpreted as the audio pause command. On the other hand, if a touch input is detected on the first partial area 1711 while the playback of the sound source is paused, the touch input may be interpreted as the audio playback command.

Additionally, if a touch input is detected in the second partial area 1712, the audio playback control may be performed. For example, when a touch input (e.g., drag) in a direction R1 is detected in the second partial area 1712 as shown in (a) of FIG. 11, the touch input may be recognized as a control command related to "next", and thus, audio control such as fast-forwarding or playing the next track may be performed.

The distinction between fast-forwarding and playing the next track is determined by whether a program (or application) for audio playback supports the corresponding functions. If the sound source is output by a program or application for audio playback installed on the display device 100 or if the sound source is streamed wirelessly through the external device 700 and output through the display device 100, the distinction is determined by functions defined for a program or application installed on the external device 700. If the program or application supports both the control functions: fast-forwarding and playing the next track, the control functions may be distinguished. If the program or application supports only one of the control functions, the control of the supported function is executed.

If the program or application supports both the control functions: fast-forwarding and playing the next track, the distinction between fast-forwarding and playing the next track may be determined by the duration of the touch input in the direction R1. If the duration of the touch input is within a predetermined range, the touch input may be determined as control for playing the next track, and if the duration of the touch input is longer than the predetermined range, the touch input may be determined as control for fast-forwarding.

If a touch input (e.g., drag) in a direction R2 is detected in the second partial area 1712 as shown in (a) of FIG. 11, the touch input is recognized as a control command related to "previous", and thus, control such as rewinding or playing the previous track may be performed.

Whether control functions are differentiated for the "previous" command may be dependent on functions supported by the program or application for audio playback, similarly to those of the "next" control command described above. If both the control functions: rewinding and playing the previous track are supported, the distinction between the two control functions may be determined by the duration of the touch input.

Although not illustrated in FIG. 11, an additional partial area may be designated for an additional touch user interface. This partial area is referred to as a third partial area. A user interface (e.g., icon) for performing other applications or programs capable of being executed on the display device 100 may be configured and displayed in the third area. When the user applies a touch input to the corresponding user interface, an application or program related thereto is launched, and a scene for the executed application or program is displayed on the display.

When a sound source is playing, information on the lyrics of the playing sound source may be displayed in a portion of the turntable-themed screen 710. The displayed lyrics information may be visually synchronized with the playback of the sound source (for example, the lyrics corresponding to the current verse of the sound source is emphasized).

Additionally, an image related to the corresponding sound source (e.g., album cover image) may be displayed in the center of the LP record 712 displayed on the turntable-themed screen 710.

Figure 12:
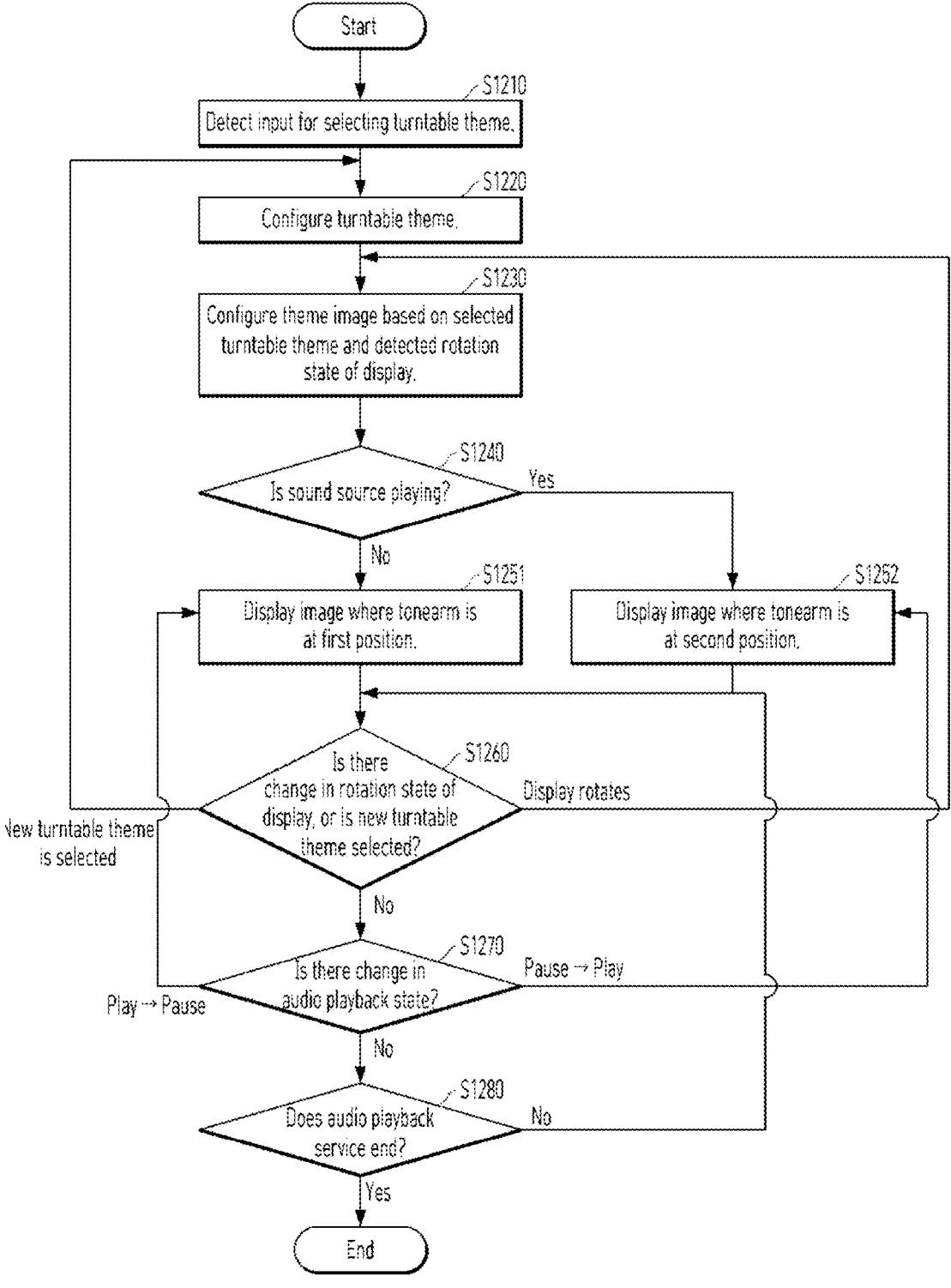
FIG. 12 illustrates a flowchart for a method according to an embodiment of the present disclosure.

FIG. 12 illustrates a flowchart of a method for the proposed technology. The method illustrated in FIG. 12 is performed by the display device 100. The corresponding method may be initiated when a service (e.g., application) for playing a sound source is executed on the display device 100.

The display device 100 may detect an input for selecting a turntable theme (S1210). The turntable theme 710 may be selected by the user through the user interface, and one of a plurality of candidate turntable themes may be provided as the default option.

The display device 100 may configure information on the turntable theme that is selected or configured by default (hereinafter, such a turntable theme is referred to as "selected turntable theme") (S1220). This step corresponds to a preparatory procedure for displaying the selected turntable theme 710 on the display 150 if there are a plurality of candidate turntable themes stored in the storage 140 of the display device 100.

The display device 100 may configure a theme image based on the selected turntable theme and a detected rotation state of the display 150 (e.g., landscape mode or portrait mode) (S1230). This step may include displaying, by the display device 100, an initial image on the display 150, which corresponds to the landscape mode or portrait mode of the selected turntable theme. For example, if the display is in the landscape mode, the image shown in (a) of FIG. 7 may be displayed, whereas if the display is in the portrait mode, the image shown in (b) of FIG. 7 may be displayed.

The display device 100 may check an audio playback state (S1240). If the playback of the sound source is paused, the display device 100 may display an image (i.e., initial image) where the tonearm of the selected turntable theme is at a first position (i.e., initial position) on the display 150 (S1251). If the initial image is displayed in S1230, the display device 100 maintains the displayed initial image.

When the sound source is playing, the display device 100 may display an image where the tonearm of the selected turntable theme is at a second position (i.e., on the LP record) on the display 150 (hereinafter, such an image is referred to as "playback position image") (S1252). Before displaying the image, the display device 100 may display a video that depicts the movement of the tonearm from the first position to the second position on the display 150 (hereinafter, such a video is referred to as "first tonearm movement image").

The playback position image may include a video showing that the tonearm swings around the swing axis at the second position.

In summary, when the sound source is playing, the display device 100 sequentially outputs a total of three images: the initial image, the tonearm movement image, and the playback position image. Some of these images may be provided in the form of a video.

The display device 100 may detect changes in the rotation state of the display 150 or detect selection of a new turntable theme (S1260).

When the new turntable theme is selected, the display device 100 may return to step S1220 and execute the method again.

When the rotation state of the display 150 changes, the display device 100 may return to step S1230 and execute the method again.

If there are no changes in the rotation state of the display 150 or if no new turntable theme is selected, the display device 100 may determine whether the audio playback state changes and how the audio playback state changes (S1270). The change in the audio playback state depends on an audio control command input to the user interface. The input of the audio control command includes touch inputs on the user interface 713 for audio playback control shown in FIGS. 7 to 11 or inputs on the user interface of the external device 700.

When it is confirmed that the audio playback state changes from play to pause, the display device 100 returns to step S1251. That is, the display device 100 displays the image where the tonearm of the selected turntable theme is at the first position on the display 150. Prior to this, the display device 100 may display a video showing the movement of the tonearm from the second position to the first position on the display 150 (hereinafter, such a video is referred to as "second tonearm movement image").

In summary, when the audio playback state changes from play to pause, the display device 100 sequentially outputs a total of three images: the playback position image, the second tonearm movement image, and the initial image, some of which are provided in the form of a video.

When it is confirmed that the audio playback state changes from pause to play, the display device 100 returns to step S1252. In other words, the display device 100 displays the image (i.e., the playback position image) where the tonearm of the selected turntable theme is at the second position on the display 150. Prior to this, the display device 100 may display the video (i.e., the first tonearm movement image) showing the movement of the tonearm from the first position to the second position on the display 150.

If there are no changes in the audio playback state, the display device 100 may check whether the audio playback service ends (S1240). If the audio playback service ends, the method is terminated.

If the audio playback service does not end, the display device 100 returns to step S1260 and performs the method gain.

Hereinabove, the flowchart shown in FIG. 12 has been described. The content described above with reference to FIGS. 1 to 11, although not explained in FIG. 12, may be performed in the method for the proposed technology.

Figure 13:
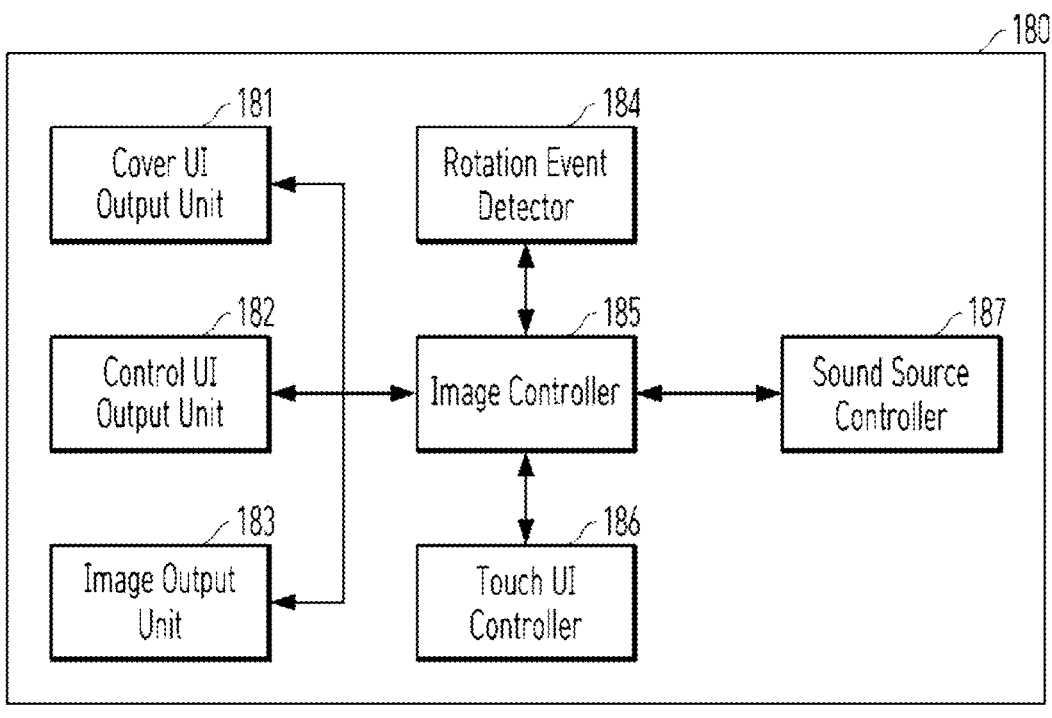
FIG. 13 illustrates a block diagram of a device according to an embodiment of the present disclosure.

FIG. 13 illustrates a block diagram of a device for the proposed technology.

The controller 180 of the display device 100 may include a cover UI output unit 181, a control UI output unit 182, an image output unit 183, a rotation event detector 184, an image controller 185, a touch UI controller 186, and a sound source controller 187.

The controller 180 of the display device 100 controls the display 150 to display the turntable-themed screen 710 shown in FIGS. 7 to 11. In addition, the controller 180 of the display device 100 controls the display 150 to display an image based on an input to the user interface displayed on the turntable-themed screen 710 (or based on an input to the user interface of the external device 700). Furthermore, the controller 180 of the display device 100 detects an input to the user interface and then controls the following operations: playback of a sound source, execution of other applications or programs, or output of a sound source through the audio output unit 160. The output of the image based on the input to the user interface may be interconnected with the output of the sound source.

The cover UI output unit 181 may display an image related to the sound source (e.g., album cover image) in the center of the LP record 712 within the turntable-themed screen 710 through the display 150.

The control UI output unit 182 displays, on the display 150, an image of the information and control part (i.e., the area B of FIG. 9) including the user interface for interaction with the user. For example, the image may include the user interface 713 for audio playback control and the sound source information display window 714. If multiple turntable-themed screens are provided, a different user interface may be configured for each turntable theme screen.

The image output unit 183 displays, on the display 150, an image of the image part (i.e., the area A of FIG. 9) including the tonearm 711 and the LP record 712 of the turntable-themed screen 710 as well as the main components of a turntable such as a base or plinth.

The rotation event detector 184 may detect the rotation state of the display 150. The rotation state refers to whether the display 150 is in the landscape or portrait mode. The rotation event detector 184 may detect the event that the display 150 rotates from the landscape mode to the portrait mode or from the portrait mode to the landscape mode.

The image controller 185 may control the remaining components, for example, the cover UI output unit 181, control UI output unit 182, rotation event detector 184, image controller 185, touch UI controller 186, and sound source controller 187. To this end, the image controller 185 may exchange information with each component.

The image controller 185 configures or controls the image, user interface, and touch user interface displayed on the display 150.

The image controller 185 may configure a turntable-themed image based on a turntable theme selected by an input to the user interface or a turntable theme configured as the default option. In addition, the image controller 185 may control the image output unit 183 to display the configured turntable-themed image on the display 150.

The image controller 185 detects a user's touch input provided from the touch UI controller 186 and controls the display 150 to display an image and a user interfaces related to the detected touch input.

The image controller 185 transmits an audio control command related to the detected touch input to the sound source controller 187.

The image controller 185 configures the image of the selected turntable theme to be displayed on the display 150 (determines either the landscape mode or the portrait mode), depending on the rotation state of the display 150, which is detected by the rotation event detector 184. Accordingly, the image controller 185 may control the display 150 to display the image of the selected turntable theme.

Based on the image of the turntable theme to be displayed on the display 150, the touch UI controller 186 may configure touch user interfaces to be displayed in specific areas of the display 150 (e.g., the first partial area 1711 and second partial area 1712 of the turntable-themed screen 710 of FIG. 10). In addition, the touch UI controller 186 may forward inputs (i.e., touch inputs) applied to the touch user interfaces to the image controller 185. These touch inputs include inputs for audio playback control, for example, play, pause, next (playing the next track, fast-forwarding, etc.), and previous (playing the previous track, rewinding, etc.).

The sound source controller 187 receives an audio control command based on the touch input and may control the playback of the sound source based on the audio control command (for example, play, pause, next (playing the next track, fast-forwarding, etc.), and previous (playing the previous track, rewinding, etc.)).

When the sound source is received (i.e., streamed) from the external device 700 that is wirelessly connected to the display device 100 and the sound source is output as audio signals through the audio output unit 160, the sound source controller 187 may forward the audio control command based on the touch input to the external device 700. Then, the external device 700 may control the playback of the sound source based on the received audio control command and transmit playback state information (e.g., play/pause, playback time, etc.) back to the sound source controller 187. The sound source controller 187 may further forward the received playback state information to the control UI output unit 182 and/or the image controller 185 to display an image or user interface related thereto.

FIG. 13 shows that the controller 180 includes the cover UI output unit 181, control UI output unit 182, image output unit 183, rotation event detector 184, image controller 185, touch UI controller 186, and sound source controller 187. In addition, these components have been illustrated to implement the present disclosure, and the present disclosure has been described based on the components. However, the functions or operations of the cover UI output unit 181, control UI output unit 182, image output unit 183, rotation event detector 184, image controller 185, touch UI controller 186, and sound source controller 187 may also be integrated and performed by the controller 180.

According to this configuration, the display device 100 according to the present disclosure may include the display 150, the audio output unit 160, and the control unit 180. Here, the audio output unit 160 is referred to as a speaker, and the control unit 180 is referred to as a controller. In addition, the display device 100 includes a transceiver for exchanging data with the external device 700 such as a mobile device by wire or wirelessly.

The display 150 displays a user interface and video data. In addition, the display 150 includes a touch screen. The speaker 160 outputs a sound source as audio signals.

The controller 180 detects control commands for audio data received from a mobile device or input to the user interface. Here, the control commands for the audio data may be to control the playback of the audio data such as play, pause, previous, next, etc. Each command may be referred to as a specific type of control command, for example, a first type of control command, a second type of control command, and so on.

The controller 180 controls the display 150 to display a first video in which an image corresponding to a tonearm moves from a first position to a second position, based on the first type of control command for the audio data, which is received from the mobile device or input to the user interface. In addition, the controller 180 controls the display 150 to display a second video in which the image corresponding to the tonearm moves from the second position to the first position, based on the second type of control command for the audio data, which is received from the mobile device or input to the user interface.

The controller 180 controls the display 150 to display a third video while the audio data is output based on the control command for the audio data. The third video depicts that as the playback time of the sound source passes, the tonearm swings along a swing path around a swing axis of the tonearm. In addition, the third video may depict that an LP record rotates around a rotation axis.

The controller 180 divides the display 150 into at least two areas. The controller 180 displays an image of a turntable having the LP record placed thereon in a first area of the at least two areas. The controller 180 displays the user interface for controlling the playback of the sound source in a second area. The controller 180 may display lyric information on the sound source on a portion of the display 150.

The controller 180 may configure a first touch user interface in a first partial area corresponding to the tonearm of the turntable video (i.e., any one of the first to third videos) displayed in the first area among the at least two areas of the display 150. The controller 180 may configure a second touch user interface in a second partial area corresponding to the LP recode of the turntable image displayed in the first area.

When a touch in a first direction is detected on the first touch user interface, the controller 180 may control the display 150 to display the first video in which the image corresponding to the tonearm moves to the second position. When a touch in a second direction is detected on the first touch user interface, the controller 180 may control the display 150 to display the second video in which the image corresponding to the tonearm moves to the first position.

The controller 180 may perform predefined control of the audio data based on detection of the touch in the first direction input to the second touch user interface (that is, the controller 180 executes first playback control, for example, an audio control command corresponding to "NEXT" input to the user interface 713). The controller 180 may perform predefined control of the audio data based on detection of the touch in the first direction input to the second touch user interface (that is, the controller 180 executes second playback control, for example, an audio control command corresponding to "PREVIOUS" input to the user interface 713).

The controller 180 may display a user interface for executing another application in a third partial area of the display 150. A touch UI may be configured in the area where the corresponding user interface is displayed, thereby detecting a user's touch input. Accordingly, when the user's touch input is detected, the controller 180 may execute the other application installed on the display device 100 and display an image for the executed application on the display 150.

The controller 180 may display the cover image of the sound source in the center of the LP record displayed in the first area.

The controller 180 may control the speaker 160 to output audio signals for the sound source while displaying the first video and prevent the speaker 160 from outputting the audio signals for the sound source while displaying the second video.

The controller 180 may control the speaker 160 to output noise sound along with the sound source while displaying the third video on the display 150.

The controller 180 may receive the control commands for the audio data from the remote control device 200. Specifically, the first or second type of control command for the audio data is input through the remote control device 200, and thus, the controller 180 may control the display 150 to display the first to third videos.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the scope of the disclosure. Therefore, the present disclosure is not limited to the embodiments disclosed herein but intends to give the broadest scope consistent with the new principles and features disclosed herein.

What is claimed is:

1. A movable display apparatus configured to display a turntable-themed video, the movable display apparatus comprising:

a transceiver configured to transmit and receive data to and from a mobile device by wire or wirelessly;

a display having a touch screen and configured to display video data and a user interface;

a speaker configured to output audio data received from the mobile device; and at least one processor configured to:

control the display to display a turntable comprising a long-playing (LP) record and a tonearm;

receive a touch input to the user interface corresponding to a control command for the audio data, wherein the touch input has no directionality and is received at a first partial area comprising the tonearm, and wherein a position of the first partial area moves between a first position and at least one second position;

determine that the control command is for playing the audio data based on the first partial area being positioned in the first position when the touch input is received to the first partial area, and determine that the control command is for pausing the audio data based on the first partial area being positioned in one of the at least one second position when the touch input is received to the first partial area;

execute the control command to play or pause the audio data based on a determination of the control command;

display a first video depicting a tonearm of a turntable moving from a first position to a second position, based on the control command for the audio data received from the mobile device being a 'play' command; and display a second video depicting the tonearm of the turntable moving from the second position to the first position, based on the control command for the audio data received from the mobile device being a a 'pause' command.

2. The movable display apparatus of claim 1, wherein the at least one processor is further configured to control the display to display a third video while the speaker outputs the audio data based on the detected control command for the audio data being the 'play' command.

3. The movable display apparatus of claim 2, wherein the third video depicts that the tonearm swings along a swing path around a swing axis and a long-playing (LP) record rotates around a rotation axis as output of the audio data by the speaker continues.

4. The movable display apparatus of claim 2, wherein the at least one processor is further configured to control the speaker to output noise audio data with the audio data while the display displays the third video.

5. The movable display apparatus of claim 1, wherein the at least one processor is further configured to:

divide the display into at least two areas including a first area and a second area; and control the display to display the first video or the second video in the first area and display the user interface in the second area.

6. The movable display apparatus of claim 5, wherein at least one processor is further configured to control the display to display lyrics information corresponding to the audio data in a portion of the first area or a portion of the second area.

7. The movable display apparatus of claim 5, wherein the at least one processor is further configured to control the display to display a user interface for executing other applications in a third area of the display.

8. The movable display apparatus of claim 5, wherein the at least one processor is further configured to control the display to display a cover image corresponding to the audio data in a center of a long-playing (LP) record in the first video or the second video.

9. The movable display apparatus of claim 1, wherein the at least one processor is further configured to:

configure a first touch user interface in a first area of the display corresponding to the tonearm in the video data; and configure a second touch user interface in a second area of the display corresponding to a long-playing (LP) record in the video data.

10. The movable display apparatus of claim 9, wherein the at least one processor is further configured to:

control the display to display the first video based on detection of a touch input along a first direction received through the first touch user interface; and control the display to display the second video based on detection of a touch input along a second direction received through the first touch user interface.

11. The movable display apparatus of claim 9, wherein the at least one processor is further configured to:

control the speaker to output the audio data based on detection of a touch input along a first direction received through the second touch user interface; and control the speaker to output the audio data based on detection of a touch input along a second direction received through the second touch user interface.

12. The movable display apparatus of claim 1, wherein the at least one processor is further configured to:

detect a rotation state of the display; and control the display to display the video data based on the detected rotation state.

13. The movable display apparatus of claim 1, wherein the at least one processor is further configured to:

detect an input that selects one of a plurality of turntable themes; and control the display to display the video data based on the selected turntable theme.

14. The movable display apparatus of claim 1, wherein the first video comprises:

a first segment depicting the tonearm of the turntable at the first position;

a second segment depicting the tonearm moving from the first position to the second position; and a third segment depicting the tonearm of the turntable at the second position.

15. The movable display apparatus of claim 1, wherein the second video comprises:

a first segment depicting the tonearm of the turntable at the second position;

a second segment depicting the tonearm moving from the second position to the first position; and a third segment depicting the tonearm of the turntable at the first position.

16. The movable display apparatus of claim 1, wherein the at least one processor is further configured to:

control the speaker to output the audio data while the display displays the first video; and prevent the speaker from outputting the audio data while the display displays the second video.

17. The movable display apparatus of claim 1, wherein the at least one processor is further configured to:

receive a second touch input to the user interface corresponding to a second control command for the audio data, wherein the second touch input is in a particular direction and received at a second partial area comprising the LP record; and determine a playback control to execute corresponding to the second control command based on a direction and a duration of the second touch input received to the second partial area comprising the LP record.

18. The movable display apparatus of claim 17, wherein:

based on the second touch input received to the second partial area comprising the LP record being in a first direction, the playback control is determined as a 'rewind' command when the duration of the second touch input is equal to or less than a threshold time and determined as a 'previous track' command when the duration of the second touch input is greater than the threshold time; and based on the second touch input received to the second partial area comprising the LP record being in a second direction, the playback control is determined as a 'fast-forward' command when the duration of the second touch input is equal to or less than the threshold time and determined as a 'next track' command when the duration of the second touch input is greater than the threshold time.

19. A method of controlling a movable display apparatus to display a turntable-themed video, the movable display apparatus comprising a transceiver configured to transmit and receive data to and from a mobile device by wire or wirelessly, a display having a touch screen and configured to display video data and a user interface for receiving control commands for audio data, a speaker configured to output the audio data received from the mobile device, and at least one processor, the method comprising:

controlling, by the at least one processor, the display to display a turntable comprising a long-playing (LP) record and a tonearm;

receiving a touch input to the user interface corresponding to a control command for the audio data, wherein the touch input has no directionality and is received at a first partial area comprising the tonearm, and wherein a position of the first partial area moves between a first position and at least one second position;

determining that the control command is for playing the audio data based on the first partial area being positioned in the first position when the touch input is received to the first partial area, and determine that the control command is for pausing the audio data based on the first partial area being positioned in one of the at least one second position when the touch input is received to the first partial area;

executing the control command to play or pause the audio data based on a determination of the control command;

displaying a first video depicting a tonearm of a turntable moving from a first position to a second position, based on the control command for the audio data received from the mobile device being a 'play' command; and displaying a second video depicting the tonearm of the turntable moving from the second position to the first position, based on the control command for the audio data received from the mobile device being a 'pause' command.

20. The method of claim 19, further comprising controlling, by the at least one processor, the display to display a third video while the speaker outputs the audio data based on the detected control command for the audio data being the 'play' command.

21. The method of claim 19, further comprising:

controlling, by the at least one processor, the display to display the first video or the second video in a first area among at least two areas of the display; and controlling, by the at least one processor, the display to display the user interface in a second area among the at least two areas.

22. The method of claim 19, further comprising:

detecting, by the at least one processor, a touch input received through a first touch user interface configured in a first area of the video data corresponding to the tonearm in the video data;

controlling, by the at least one processor, the display to display the first video based on the touch input being along a first direction; and controlling, by the at least one processor, the display to display the second video based on the touch input being along a second direction.

23. The method of claim 19, further comprising:

receiving a second touch input to the user interface corresponding to a second control command for the audio data, wherein the second touch input is in a particular direction and received at a second partial area comprising the LP record; and determining a playback control to execute corresponding to the second control command based on a direction and a duration of the second touch input received to the second partial area comprising the LP record.

24. The method of claim 23, wherein:

based on the second touch input received to the second partial area comprising the LP record being in a first direction, the playback control is determined as a 'rewind' command when the duration of the second touch input is equal to or less than a threshold time and determined as a 'previous track' command when the duration of the second touch input is greater than the threshold time; and based on the second touch input received to the second partial area comprising the LP record being in a second direction, the playback control is determined as a 'fast-forward' command when the duration of the second touch input is equal to or less than the threshold time and determined as a 'next track' command when the duration of the second touch input is greater than the threshold time.

* * * * *